(12) United States Patent
Kawamoto (10) Patent No.: US 6,374,789 B2
(45) Date of Patent: Apr. 23, 2002

(54) CAM SHAFT DRIVING STRUCTURE OF SOHC V-TYPE ENGINE

(75) Inventor: Yuichi Kawamoto, Akashi (JP)

(73) Assignee: Kawasaki Jukogyo Kabushiki Kaisha (JP)

( * ) Notice: Subject to any disclaimer, the term of this patent is extended or adjusted under 35 U.S.C. 154(b) by 0 days.

(21) Appl. No.: 09/771,848

(22) Filed: Jan. 29, 2001

(51) Int. Cl.[7] .................................................. F01L 1/02
(52) U.S. Cl. ..................... 123/90.31; 123/54.4
(58) Field of Search ........................ 123/90.27, 90.31, 123/54.4, 54.5, 54.6, 54.7, 54.8

(56) References Cited

U.S. PATENT DOCUMENTS

| | | | | |
|---|---|---|---|---|
| 4,633,826 A | * | 1/1987 | Tominaga et al. | 123/90.31 |
| 5,010,859 A | * | 4/1991 | Ogami et al. | 123/195 C |
| 5,033,421 A | * | 7/1991 | Shimada et al. | 123/90.27 |
| 5,970,931 A | * | 10/1999 | Kawarabata | 123/90.31 |

FOREIGN PATENT DOCUMENTS

JP        4-75364        11/1992

* cited by examiner

*Primary Examiner*—Weilun Lo
(74) *Attorney, Agent, or Firm*—Marshall, Gerstein & Borun (57) ABSTRACT

A cam shaft driving structure of an SOHC V-type engine comprises a crank shaft; a first cam shaft and a second cam shaft respectively provided in a cylinder head of a first cylinder and a cylinder of a second cylinder; an intermediate shaft rotatably provided in an upper portion of the crank case, a first cam chain and a second cam chain, an intermediate shaft chain; a first cam chain guide and a second cam chain guide for respectively guiding a tense side of the first cam chain and a loose side of the first cam chain; and a third cam chain guide and a fourth cam chain guide for respectively guiding a tense side of the second cam chain and a loose side of the second cam chain guide, wherein a fulcrum of the second cam chain guide and a fulcrum of the fourth cam chain guide are provided in the vicinity of the intermediate shaft, a first tensioner for the cam chain guide associated with one of the first and second cam chains in which its loose side corresponds to its upper side is provided in the corresponding cylinder head, and a second tensioner for the cam chain guide associated with one of the first and second cam chains in which its loose side corresponds to its lower side is provided in a cylinder block of one of the first and second cylinders.

6 Claims, 3 Drawing Sheets

CAM SHAFT DRIVING STRUCTURE OF SOHC V-TYPE ENGINE

BACKGROUND OF THE INVENTION

1. Field of the Invention

The present invention relates to a cam shaft driving structure of an SOHC (Single Overhead Cam) V-type engine and, more particularly to a cam shaft driving structure for driving a cam shaft by a crank shaft via an intermediate shaft.

2. Description of the Related Art

A cam shaft driving structure of an SOHC V-type engine is generally structured such that the cam shaft provided in a cylinder head of each of cylinders inclined forward and rearward is provided with a sprocket and a crank shaft is provided with a sprocket for the cam shaft of each of the cylinders, and the sprocket of the cam shaft is directly driven by the sprocket of the crank shaft via a chain. However, in this configuration, since it is necessary to provide two sprockets on the crank shaft to drive the cam shafts, the crank shaft becomes long. Consequently, a width of the engine is increased.

As an example of a cam shaft driving structure in which a width of an overhead cam shaft V-type engine is reduced, a double overhead cam V-type engine is known, in which cam shafts of forward and rearward cylinders are driven by a crank shaft via an intermediate shaft (see Publication of Examined Patent Application No. Hei.4-75364).

In this engine, the intermediate shaft is provided with two sprockets for respectively driving the cam shaft of the forward cylinder and the cam shaft of the rearward cylinder and the crank shaft is provided with one sprocket for driving the intermediate shaft. Because one sprocket on the crank shaft can be dispensed with as compared to a case where the cam shafts of the respective cylinders are directly driven by the crank shaft, a length of the crank shaft can be reduced. Therefore, a width of the engine can be reduced.

When the SOHC V-type engine is provided with the intermediate shaft to reduce the width of the engine, the following problems arise.

1) It is difficult to optimize a direction in which a tensioner of a swingable chain guide for guiding a cam chain exerts a force with respect to a chain.
2) It is difficult to use raw members of cylinder blocks or cylinder heads to which the tensioners are to be attached as physically identical raw members, or their shapes are complex.
3) Since the type or the number of parts is increased, cost is disadvantageously high.

SUMMARY OF THE INVENTION

The present invention has been developed for obviating the above-described problem, and an object of the present invention is to provide a cam shaft driving structure of an SOHC V-type engine which can drive a cam shaft of each of cylinders by a crank shaft via an intermediate shaft to reduce a width of the engine and have interchangeable or common parts as much as possible.

To achieve the above-described problem, there is provided a cam shaft driving structure of an Single Overhead Cam V-type engine comprising: a crank shaft provided in a crank case; a first cam shaft and a second cam shaft respectively provided in a cylinder head of a first cylinder and a cylinder head of a second cylinder, the first and second cylinders being arranged in an upper portion of the crank case such that the first and second cylinders are widened in V-shape in a forward and rearward direction with the crank shaft as a center; an intermediate shaft rotatably provided in a portion of the crank case that is situated above the crank shaft and in parallel with the crank shaft; a first cam chain and a second cam chain for respectively transmitting rotation of the intermediate shaft to the first and second cam shafts; an intermediate shaft chain for transmitting rotation of the crank shaft to the intermediate shaft; a first cam chain guide and a second cam chain guide for respectively guiding a tense side of the first cam chain and a loose side of the first cam chain; and a third cam chain guide and a fourth cam chain guide for respectively guiding a tense side of the second cam chain and a loose side of the second cam chain, wherein a fulcrum of the second cam chain guide and a fulcrum of the fourth cam chain guide are provided in the vicinity of the intermediate shaft, a first tensioner for the cam chain guide associated with one of the first and second cam chains in which its loose side corresponds to its upper side is provided in one of the cylinder heads, and a second tensioner for the cam chain guide associated with one of the first and second cam chains in which its loose side corresponds to its lower side is provided in a cylinder block of the cylinder.

With this configuration, the tensioners are placed in the cylinder block and the cylinder head. Thereby, the tensioners are capable of exerting forces to the cam chains in suitable directions.

It is preferable that each of the second cam chain guide and the fourth cam chain guide is provided with two portions which respectively abut with the tensioners.

With this configuration, the cam chain guides associated with the loose sides of the cam chains are interchangeable between them.

The cam shaft driving structure of the Single Overhead Cam V-type engine may further comprise a means for positioning the first cam chain guide in a direction toward a base end thereof and a means for positioning the third cam chain guide in a direction toward a base end thereof in the crank case, wherein each of the first cam chain guide and the third cam chain guide is positioned in a direction toward a tip end thereof by a lower face of the corresponding cylinder head and is provided with two protrusions that abut with the corresponding cylinder block.

With this configuration, the chain guides associated with the tense sides of the cam chains are interchangeable between them.

Further, the cam shaft driving structure of the Single Overhead Cam V-type engine, may have the following structure: the first and second cylinders are arranged such that one of the cylinders substantially overlaps with the other cylinder except the first to fourth cam chain guides and the first and second tensioners, if the one cylinder is rotated 180 degrees about an imaginary axis orthogonal to a center axis of the crank shaft and a center axis of the intermediate shaft, each of the first and second cylinders is provided with a chain tunnel as a passage of the corresponding cam chain, the tunnel extending from a portion where a sprocket of the intermediate shaft is provided in the crank case to a portion where a sprocket of the cam shaft is provided in the corresponding cylinder head via the corresponding cylinder block, each of the cylinder head of the first cylinder and the cylinder head of the second cylinder is structured such that a boss to which the first tensioner is mounted when used in the cylinder associated with the cam chain in which its upper side corresponds to its loose side, is provided in a wall portion of the chain tunnel that is situated in the corresponding cylinder head, a first positioning portion is provided in an inner wall face of the cam chain tunnel that is situated on the same side of the wall portion where the boss is provided, for positioning one of the second and fourth cam chain guides associated with the cam chain in which its tense side corresponds to its upper side, in a direction toward the cam shaft in a longitudinal direction thereof, and a second positioning portion is provided in an inner wall face of the chain tunnel that is situated on an opposite side of the wall portion where the boss is provided, for positioning one of the second and fourth cam chain guides associated with the cam chain in which its tense side corresponds to its lower side, in a direction toward the cam shaft in a longitudinal direction thereof, and each of the cylinder block of the first cylinder and the cylinder block of the second block is structured such that a boss to which the second tensioner is mounted when used in the cylinder associated with the cam chain in which its lower side corresponds to its loose side is provided in a wall portion of the chain tunnel that is situated in a corresponding cylinder block, an inner wall face of the chain tunnel that is situated on the same side of the wall portion where the boss is provided is shaped to enable abutment with a back face of one of the second and fourth cam chain guides associated with the cam chain in which its tense side corresponds to its lower side, and an inner wall face of the cam chain tunnel that is situated on an opposite side of the wall portion where the boss is provided is shaped to enable abutment with a back face of one of the second and fourth cam chain guides associated with the cam chain in which its tense side corresponds to its upper side.

With this configuration, the raw members from which the cylinder heads are made are interchangeable between them, and the raw members from which the cylinder blocks are made are also interchangeable between them.

It is preferable that the cam shaft driving structure of the Single Overhead Cam V-type engine, further comprises: an intermediate shaft chain guide that swings about the fulcrum of one of the second and fourth cam chain guides associated with the cam chain in which its loose side corresponds to its lower side, thereby mailing contact with the loose side of the intermediate shaft chain.

With this configuration, the number of parts can be reduced.

It is preferable that a transmission ratio between rotation of the crank shaft and rotation of the intermediate shaft is substantially 1 to 1 and the sprockets of the intermediate shaft on which the first and second cam chains are installed have diameters substantially equal to or smaller than a diameter of the sprocket of the intermediate shaft on which the intermediate shaft chain is installed.

With this configuration, a wide space within an angle formed between the first and second cylinders can be utilized.

These objects as well as other objects, features and advantages of the invention will become apparent to those skilled in the art from the following description with reference to the accompanying drawings.

DETAILED DESCRIPTION OF THE PREFERRED EMBODIMENTS

Hereinafter, an embodiment of the present invention will be described with reference to accompanying drawings.

Figure 1:
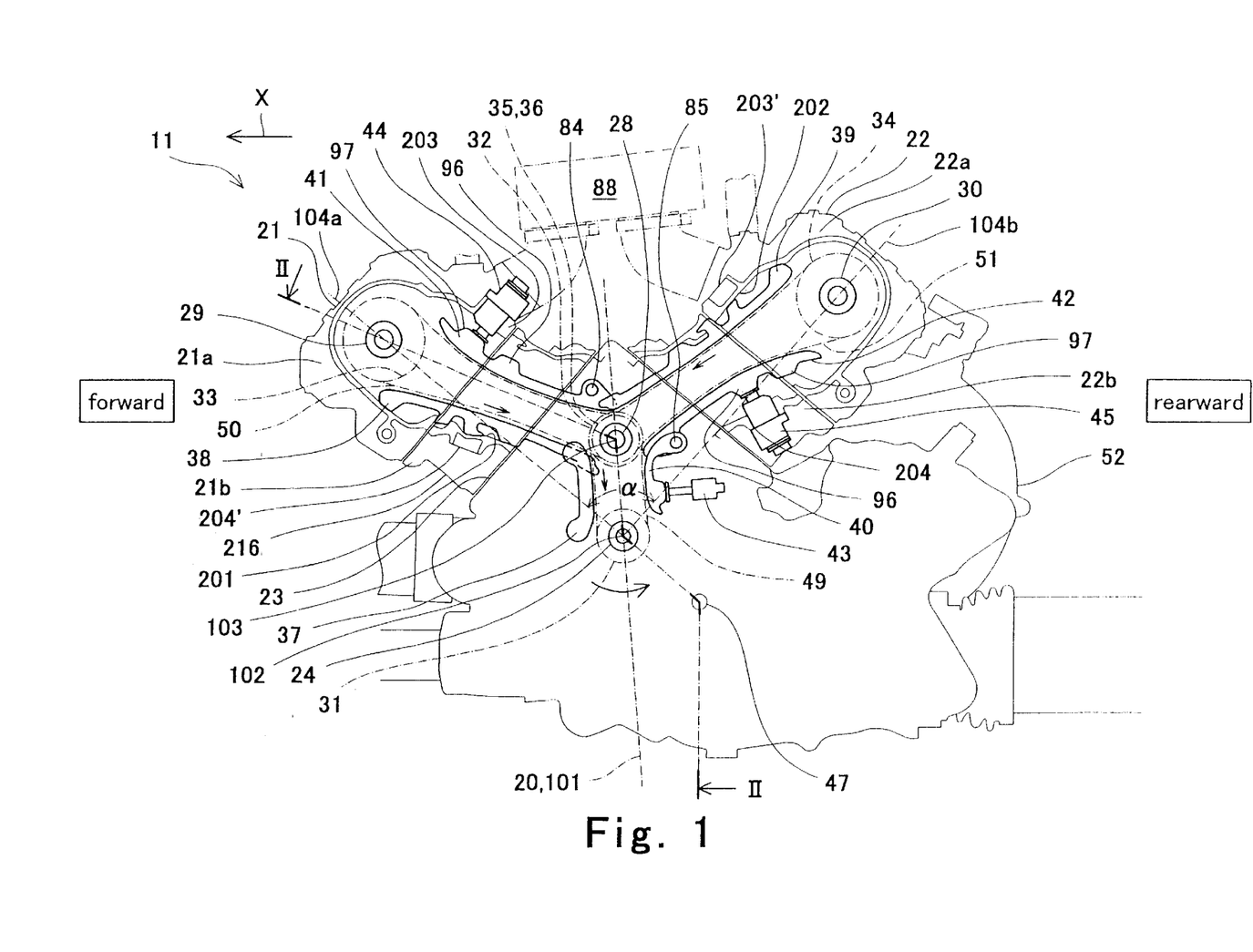
FIG. 1 is a left side view schematically showing a structure of a V-type engine which employs a cam shaft driving structure according to an embodiment of the present invention.
Figure 2:
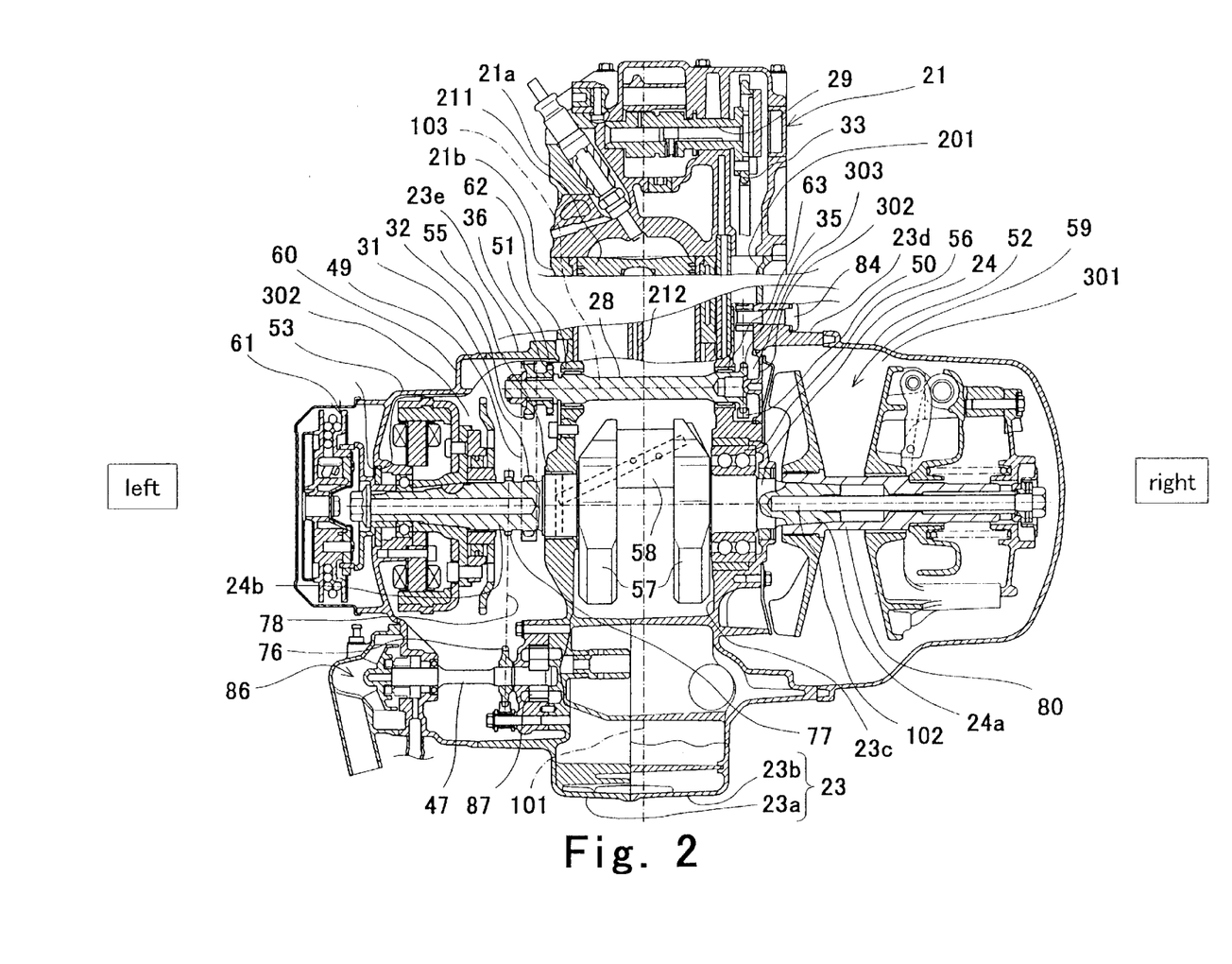
FIG. 2 is a cross-sectional view taken along line II—II of FIG. 1.
Figure 3:
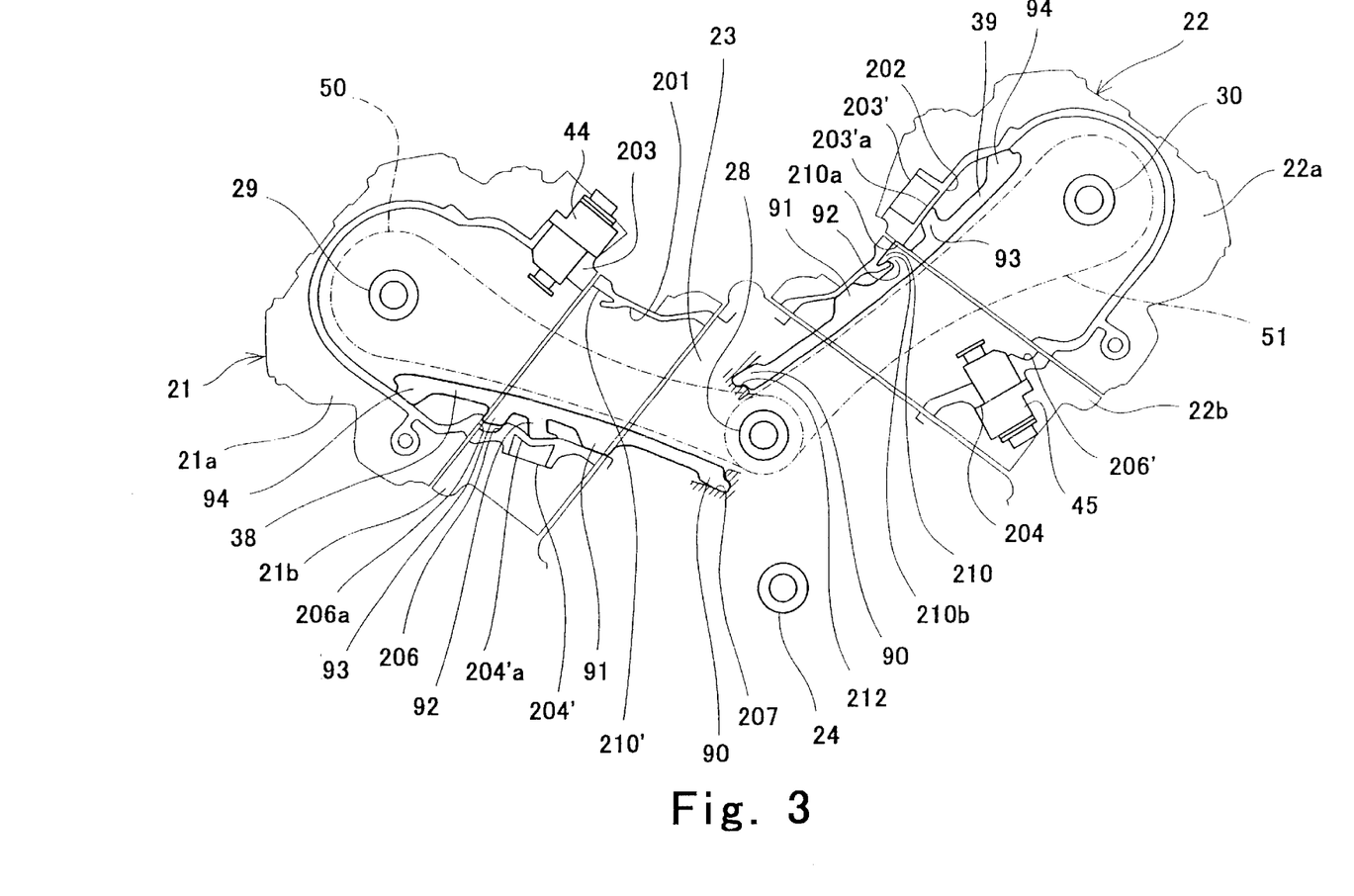
FIG. 3 is a schematic view showing a detailed structure of a cam chain tunnel of the V-type engine of FIG. 1 and a state in which a cam chain guide of the V-type engine is attached.

FIG. 1 is a left side view schematically showing a structure of a V-type (V-twin) engine which employs a cam shaft driving structure according to the embodiment of the present invention, FIG. 2 is a cross-sectional view taken along line II—II of FIG. 1, and FIG. 3 is a schematic view showing a detailed structure of a cam chain tunnel of the V-twin engine of FIG. 1 and a state in which a cam chain guide of the V-twin engine is attached. FIGS. 1 and 3 are perspectively drawn for easy understanding of the following description. In FIGS. 1 and 3, a cross section of the cam chain tunnel, cut in a plane in which a cam chain extends, is shown.

The V-twin engine of this embodiment is employed in a straddle-type four wheel all terrain vehicle and placed such that a crank shaft thereof is directed in a width direction of a vehicle body. In FIG. 1, X indicates a forward direction of the straddle-type four wheel all terrain vehicle.

Referring now to FIGS. 1 and 2, in a V-twin engine 11, a forward cylinder (first cylinder) 21 is placed forwardly and upwardly of the crank case 23 and a rearward cylinder (second cylinder) 22 is placed rearwardly and upwardly of the crank case 23 such that they are widened in V-shape in a forward and rearward direction with a center axis 102 of a crank shaft 24 as a center when seen in a side view. The forward and rearward cylinders 21, 22 are structured and arranged such that one of them substantially overlaps with the other cylinder except tensioners 44,45 and cam chain guides 39–42 if the one cylinder is rotated 180 degrees about a symmetric axis 101 orthogonal to the center axis 102 of the crank shaft 24 in a center plane 20 of an angle a formed between the cylinders 21,22. In this embodiment, the angle α between the forward and rearward cylinders 21, 22 is 90 degrees to reduce vibration of the V-twin engine 11 as much as possible.

The crank case 23 is divided into right and left crank cases 23a, 23b, which are joined to be formed into one crank case 23. A crank chamber 23c is formed inside of the crank case 23 such that it accommodates the crank shaft 24. A right base wall 23d is annularly provided such that it is protruded from a right side face of the crank case 23, and a belt converter cover 52 is joined to a tip end portion of the right base wall 23d, thereby forming a belt converter chamber 301. A left base wall 23e is annularly provided such that it is protruded from a left side face of the crank case 23, and a generator cover 53 is joined to a tip end portion of the left base wall 23e, thereby forming an auxiliary machinery chamber 302.

The crank shaft 24 penetrates through the crank chamber 23c of the crank case 23 in a rightward and leftward direction and is rotatably supported by a pair of bearings 55, 56 fixed to both side walls of the crank chamber 23c. A crank web 57 and a crank pin 58 of the crank shaft 24 are accommodated in the crank chamber 23c. A piston of the forward cylinder 21 and a piston of the rearward cylinder 22 are respectively connected to the crank pin 58 via connecting rods (A piston 211 of the forward cylinder 21 and a connecting rod 212 are shown in FIG. 2).

A first sprocket 31 is provided on a portion 24a of the crank shaft 24 that is protruded leftward from the crank chamber 23c and adjacently to the bearing 55. An intermediate shaft 28 is provided in an upper side of the crank chamber 23c such that it penetrates through the crank chamber 23c. The intermediate shaft 28 is provided in parallel with the crank shaft 24 such that it is situated above the crank shaft 24 and on the center plane 20 of the angle a between the forward and rightward cylinders 21, 22 and is rotatably supported by a pair of bearings 62, 63 fixed to both side walls of the crank chamber 23c. A fifth sprocket 35 is provided on a portion of the intermediate shaft 28 that is protruded rightward from the crank chamber 23c. The fifth sprocket 35 is accommodated in a sprocket accommodating portion 303 corresponding to a concave portion provided in an inner wall of the belt converter chamber 301 and defined by a separating member 302. A sixth sprocket 36 and the second sprocket 32 are arranged on a portion of the intermediate shaft 28 that is protruded leftward from the crank chamber 23c. Each of the sprockets 35, 36 has an outer diameter smaller than an outer diameter of the second sprocket 32. An intermediate shaft chain 49 is installed on the first sprocket 31 of the crank shaft 24 and the second sprocket 32 of the intermediate shaft 28 to interconnect them. The first sprocket 31, the second sprocket 32, and the intermediate shaft chain 49 are accommodated in the auxiliary machinery chamber 302.

The forward cylinder 21 includes a cylinder block 21b and a cylinder head 21a and the rearward cylinder 22 includes a cylinder block 22b and a cylinder head 22a. The cylinder head 21a of the forward cylinder 21 is provided with a forward cylinder cam shaft (first cam shaft) 29 and the cylinder head 22a of the rearward cylinder 22 is provided with a rearward cylinder cam shaft (second cam shaft) 30. The first and second cam shafts 29, 30 are respectively provided in parallel with the crank shaft 24. This engine is so-called an overhead cam V-type engine, in which the cam shaft 29 is provided in the forward cylinder and the cam shaft 30 is provided in the rearward cylinder and cams formed on the respective cam shafts serve to open/close intake valves and exhaust valves. The forward cylinder cam shaft 29 is provided with a third sprocket 33 and the rearward cylinder cam shaft 30 is provided with a fourth sprocket 34.

As shown in FIG. 2, the third sprocket 33 of the forward cylinder 21 is provided at a right end portion of the forward cylinder cam shaft 29. A first chain tunnel 201 extends from the sprocket accommodating portion 303 of the crank case 23, through a right side portion of the cylinder block 21b of the forward cylinder 21 and a right side portion of the cylinder head 21a of the forward cylinder 21, and to the portion where the third sprocket 33 is provided. Through the first chain tunnel 201, the first cam chain 50 is installed on the fifth sprocket 35 of the intermediate shaft 28 and the third sprocket 33 of the forward cylinder cam shaft 29 to interconnect them. The fourth sprocket 34 of the rearward cylinder 22 is provided at a left end portion of the rearward cylinder cam shaft 30 and a second chain tunnel 202 extends from a portion of the auxiliary chamber 302 where the sixth sprocket 36 is provided, through a left side portion of the cylinder block 22b of the rearward cylinder 22 and a left side portion of the cylinder head 22a of the rearward cylinder 22, and to the portion where the fourth sprocket 34 is provided, although this is not shown in FIG. 2. Through the second chain tunnel 202, the second cam chain 51 is installed on the sixth sprocket 36 and the fourth sprocket 34 of the rearward cylinder cam shaft 30 to interconnect them.

The transmission ratio between the first sprocket 31 and the second sprocket 32 is 1:1. The transmission ratio between the fifth sprocket 35 and the third sprocket 33 and the transmission ratio between the sixth sprocket 36 and the fourth sprocket 34 are respectively 1:½. Thereby, the speed of rotation of the forward cylinder cam shaft 29 and the speed of rotation of the rearward cylinder cam shaft 30 are reduced to half of the speed of rotation of the crank shaft 24. Since the transmission ratio between the first sprocket 31 and the second sprocket 32 is 1:1 and the fifth and sixth sprockets 35, 36 respectively have the diameters smaller than the diameter of the second sprocket 31 as described above, a wide space within the angle α formed between the forward and rearward cylinders 21, 22 is utilized. For example, in this embodiment, an air carburetor 88 is placed in this space.

In this embodiment, the crank shaft 24 is rotated in a counterclockwise direction seen in a left side view of FIG. 1. Therefore, the intermediate shaft chain 49 has a tense forward side and a loose rearward side, the first cam chain 50 has a tense lower side and a loose upper side, and the second cam chain 51 has a tense upper side and a loose lower side.

As shown in FIG. 1, a first intermediate shaft chain guide 37, a first cam chain guide 38, and a third cam chain guide 39 are respectively provided on the tense side of the intermediate shaft chain 49, the tense side of the first cam chain 50, and the tense side of the second cam chain 51. These chain guides are of a fixed type. A second intermediate shaft chain guide 40, a second cam chain guide 41, and a fourth cam chain guide 42 are provided on the loose side of the intermediate shaft chain 49, the loose side of the first cam chain 50, and the loose side of the second cam chain 51. These chain guides are of a swing type. An intermediate shaft chain tensioner 43, a first cam chain tensioner 44, and a second cam chain tensioner 45 are respectively provided at a tip end portion of the second intermediate shaft chain guide 40, a tip end portion of the second cam chain guide 41, and a tip end portion of the fourth cam chain guide 42.

The first intermediate shaft chain guide 37 is vertically provided such that it is in contact with the forward portion of the intermediate shaft chain 49 and has opposite ends fixed to the left side wall of the crank case 23 by mans of a bolt (not shown).

The second intermediate shaft chain guide 40 extends downwardly along the rearward portion of the intermediate shaft chain 49. A base end portion of the chain guide 40, together with a base end portion of the fourth cam chain guide 42, is rotatably supported by a support shaft 85 and a tip end portion of the chain guide 42 is pressed by the intermediate shaft chain tensioner 43. The intermediate shaft chain tensioner 43 presses the second intermediate shaft chain guide 40 against the second intermediate shaft chain 49 by using a compression spring and a ratchet mechanism (not shown) built therein to prevent the chain guide 40 from going backward. Therefore, when the intermediate shaft chain 49 is loosened, the second intermediate shaft chain guide 40 swings about the support shaft 85 toward the chain and tightens the same. The support shaft 85 is laterally provided in the vicinity of the intermediate shaft 28 in the left side face of the crank case 23 (not shown). The intermediate shaft chain tensioner 43 is fixed to the crank case 23 (not shown).

The second cam chain guide 41 and the fourth cam chain guide 42 are physically identical parts. The second cam chain guide 41 and the fourth cam chain guide 42 are elongated and slightly curved in a whole shape and faces thereof on which the corresponding chains slide are slightly curved. A shaft hole is formed in a base end portion of each of the chain guides 41, 42 and a first abutment portion 96 and a second abutment portion 97 are formed at a tip end portion of each of the chain guides 41, 42 such that they are protruded from a back face thereof.

The second cam chain guide 41 obliquely and forwardly extends along an upper side of the first cam chain 50 such that its tip end is higher. The shaft hole in the base end portion of the chain guide 41 is rotatably supported by a support shaft 84 and the second abutment portion 97 at the tip end portion of the chain guide 41 is pressed by the first cam chain tensioner 44. Like the intermediate shaft chain tensioner 43, the first cam chain tensioner 44 presses the second cam chain guide 41 against the first cam chain 50 to prevent the chain guide 41 from going backward. The support shaft 84 is laterally provided in the vicinity of the intermediate shaft 28 in the right side face of the crank case 23 (see FIG. 2). A boss 203 is formed in an inner wall face of a portion of the first cam chain tunnel 201 that is situated in the cylinder head 21a of the forward cylinder 21, which is opposite to the upper side of the first cam chain 50. The first cam chain tensioner 44 is fixed to a hole portion of the boss 203.

The fourth cam chain guide 42 obliquely and rearwardly extends along the lower side of the second cam chain 51 such that it turns over on its back and its tip end is higher. The shaft hole in the base end portion of the chain guide 42, together with the base end portion of the second intermediate shaft chain guide 40, is rotatably supported by the support shaft 85 and the first abutment portion 96 at the tip end portion of the chain guide 42 is pressed by the second cam chain tensioner 45. Like the intermediate shaft chain tensioner 43, the second cam chain tensioner 45 presses the fourth cam chain guide 42 against the second cam chain 51 to prevent the chain guide 42 from going backward. A boss 204 is provided in an inner wall face of a portion of the second cam chain tunnel 202 that is situated in the cylinder block 22b of the rearward cylinder 22, which is opposite to a lower side of the second cam chain 51. The second cam chain tensioner 45 is fixed to a hole portion of the boss 204.

As is apparent from FIG. 1, comparing the cam chain of the forward cylinder 21 and the cam chain of the rearward cylinder 22, the tense side and the loose side are situated on opposite sides. Specifically, the upper side of the cam chain of the forward cylinder 21 corresponds to the loose side, while the lower side of the cam chain of the rearward cylinder 22 corresponds to the loose side. Further, since the intermediate shaft 28 is provided, there is a great difference between an angle of the upper side of the cam chain and an angle of the lower side of the cam chain which are closer to the cam shaft, which are made with respect to each of the center planes 104a, 104b (planes including the center axis of the crank shaft 24 and the center axes of the cam shafts) of the forward and rearward cylinders when seen in a side view. That is, the upper side of the cam chain that is closer to the cam shaft is substantially parallel with each of the center planes 104a, 104b of the cylinders, while the lower side thereof intersects each of the center planes 104a, 104b of the cylinders at a considerable angle. Accordingly, the first cam chain tensioner 44 is provided in the cylinder head 21a of the forward cylinder 21 to press the second swingable cam chain guide 41 situated over the upper side of the first cam chain 50 and the second cam chain tensioner 45 is provided in the cylinder block 22b of the rearward cylinder 22 to press the fourth swingable cam chain guide 42 situated under the lower side of the second cam chain 51. Thereby, the tensioners 44, 45 are adapted to exert forces in optimized directions, i.e., in directions substantially orthogonal to the corresponding cam chain guides.

Thus, the second cam chain guide 41 and the fourth cam chain guide 42 are respectively pressed against the cam chains by the cam chain tensioners. However, since the first cam chain tensioner 44 is provided in the cylinder head 21a of the forward cylinder 21 to press the second cam chain guide 41 and the second cam chain tensioner 45 is provided in the cylinder block 22b of the rearward cylinder 22 to press the fourth cam chain guide 42, portions of the second cam chain guide 41 and the fourth cam chain guide 42 at which the cam chain tensioners abut, differ from each other between these chain guides. Accordingly, the chain guides 41, 42 are each provided with the second abutment portion 97 which abuts with the first cam chain tensioner 44 when used as the second cam chain guide 41 and with the first abutment portion 96 which abuts with the second cam chain tensioner 45 when used as the fourth cam chain guide 42. Thereby, the second cam chain guide 41 and the fourth cam chain guide 42 are interchangeable between them.

Referring to FIG. 3, the first cam chain guide 38 and the third cam chain guide 39 are physically identical. The first cam chain guide 38 and the third cam chain guide 39 are elongated and slightly curved in a whole shape, and have slightly curved faces on which the corresponding chains slide. A first claw-shaped engagement convex portion 90 is formed in the base end portion of each of the first cam chain guide 38 and the third cam chain guide 39. A first abutment portion 91, a second engagement convex portion 92, and a third engagement convex portion 93 are formed from the base end portion of each of the first and third cam chain guides 38, 39 to the tip end portion thereof in this order such that they are protruded from the back face thereof and the second abutment portion 94 is formed at the tip end portion such that it is protruded from the back face thereof. The second engagement convex portion 92 is substantially L-shaped and slightly inclined toward the base end portion. The third engagement convex portion 93 is substantially rectangular and slightly inclined toward the tip end portion.

A first engagement concave portion 207 having a shape conforming to a shape of the first engagement convex portion 90 of the first cam chain guide 38 is formed in the right side face of the crank case 23 in the vicinity of the portion where the intermediate shaft 28 is provided. A second engagement concave portion 212 having a shape conforming to a shape of the first engagement convex portion 90 of the third cam chain guide 39 is formed in the left side face of the crank case 23 in the vicinity of the portion where the intermediate shaft 28 is provided. A third engagement concave portion (second positioning portion) 206 is formed in a portion of the inner wall face of the first chain tunnel 201 of the forward cylinder 21, which is opposite to the lower side of the first cam chain 50. A fourth engagement concave portion (first positioning portion) 210 is formed in a portion of the inner wall face of the second chain tunnel 202 of the rearward cylinder 22, which is opposite to the upper side of the second cam chain 51. The third engagement concave portion 206 has a substantially rectangular cross section having a width conforming to a shape of the third engagement convex portion 93 of the first cam chain guide 38 and is structured such that a lower face of the cylinder head 21a forms an upper inner wall face 206a of the concave portion 206 at a junction of the cylinder head 21a and the cylinder block 21b of the forward cylinder 21. The fourth engagement concave portion 210 has a shape conforming to a shape of the second engagement convex portion 92 of the third cam chain guide 39 and is structured such that a lower face of the cylinder head 22a forms an upper inner wall face 210a of the concave portion 210 at a junction of the cylinder head 22a and the cylinder block 22b of the rearward cylinder 22.

The first cam chain guide 38 is fixed in such a manner that the first engagement portion 90 is fittingly inserted into the first engagement concave portion 207 of the crank case 23, the third engagement portion 93 engages with the third engagement concave portion 206 of the first chain tunnel 201, a tip end portion of the first abutment portion 91, a tip end portion of the second engagement convex portion 92, and a tip end portion of the second abutment portion 94 respectively abut with the inner wall face of the first chain tunnel 201. In this case, the first cam chain guide 38 is positioned in a longitudinal direction thereof in such a manner that a tip end portion of the first engagement convex portion 90 abuts with a bottom of the first engagement concave portion 207 and a side face of the third engagement convex portion 93 that is closer to the tip end abuts with the upper inner wall face 206a of the third engagement concave portion 206. The first cam chain guide 38 is positioned in a width direction thereof (a direction orthogonal to a slide face thereof) in such a manner that the slide face is in contact with the first cam chain 50, a tip end portion of the first abutment portion 91, a tip end portion of the second engagement convex portion 92, and a tip end portion of the second abutment portion 94 respectively abut with the inner wall face of the first chain tunnel 201.

The third cam chain guide 39 is fixed in such a manner that the first engagement portion 90 is fittingly inserted into the second engagement concave portion 212 of the crank case 23, the second engagement portion 92 engages with the fourth engagement concave portion 206 of the second chain tunnel 202, a tip end portion of the first abutment portion 91, a tip end portion of the third engagement convex portion 93, and a tip end portion of the second abutment portion 94 respectively abut with the inner wall face of the second chain tunnel 202. The third cam chain guide 39 is positioned in a longitudinal direction thereof in such a manner that a tip end portion of the first engagement convex portion 90 abuts with a bottom of the second engagement concave portion 212 and a side face of the second engagement convex portion 92 that is closer to the tip end abuts with the upper inner wall face 210a of the fourth engagement concave portion 210. The third cam chain guide 39 is positioned in a width direction thereof in such a manner that a slide face thereof is in contact with the second cam chain 51, and a tip end portion of the first abutment portion 91, a tip end portion of the second engagement convex portion 92, a tip end portion of the third engagement convex portion 93, and a tip end portion of the second abutment portion 94 respectively abut with the inner wall face of the second chain tunnel 202. The third cam chain guide 39 is structured such that the tip end portion of the third engagement convex portion 93 engages with an entrance portion 210b of the fourth engagement concave portion 210, thereby preventing the chain guide 39 from falling off.

Thus, the first cam chain guide 38 and the third cam chain guide 39 are each positioned in such a manner that the corresponding position in a direction toward the tip end thereof in the longitudinal direction thereof is determined by the lower face of the corresponding cylinder head. Since the first cam chain guide 38 is situated under the lower side of the first cam chain 50 and the third cam chain guide 39 is situated over the upper side of the second cam chain 51, there is a difference in intersecting positions with respect to the lower faces of the cylinder heads in the longitudinal directions between the first cam chain guide 38 and the third cam chain guide 39 when they are mounted. Accordingly, the chain guides 38, 39 are each provided with the third engagement convex portion 93 which abuts with the lower face 206a of the cylinder head 21a of the forward cylinder 21 when used as the first cam chain guide 38 and with the second engagement convex portion 92 which abuts with the lower face 210a of the cylinder head 22a of the rearward cylinder 22 when used as the third cam chain guide 39. The tip end portion of the second engagement convex portion 92 and the tip end portion of the third engagement convex portion 93 are utilized as the abutment portions with the inner wall face of the cam chain tunnel. The first cam chain guide 38 and the third cam chain guide 39 are each provided with the first abutment portion 91 and the second abutment portion 94. The portion of the inner wall face of the first cam chain tunnel 201, which is opposite to the lower side of the first cam chain 50, is shaped such that the tip end portion of the first abutment portion 91, the tip end portion of the second engagement convex portion 92, and the tip end portion of the second abutment portion 94 abut with the portion of the inner wall face of the tunnel 201 when the chain guides 38, 39 are used as the first cam chain guide 38 and the portion of the inner wall face of the second cam chain tunnel 202, which is opposite to the upper side of the second cam chain 51, is shaped such that the tip end portion of the first abutment portion 91, the tip end portion of the second engagement convex portion 92, the tip end portion of the third engagement convex portion 93, and the tip end portion of the second abutment portion 94 abut with the portion of the inner wall face of the tunnel 202 when the chain guides 38, 39 are used as the third cam chain guide 39. Thereby, the first cam chain guide 38 and the third cam chain guide 39 are interchangeable between them.

As described above, since the fourth cam chain guide 42 and the second intermediate shaft chain guide 40 are rotatably supported by the support shaft 85 as a common support shaft, the number of parts and man-hour of the assembly is reduced (see FIG. 1).

As mentioned previously, the forward and rearward cylinders 21, 22 are arranged such that one of them substantially overlaps with the other cylinder except the tensioners 44, 45, and cam chain guides 39–42 if the one cylinder is rotated 180 degrees about the symmetric axis 101 (see FIG. 2). Since the cam chain of the forward cylinder 21 and the cam chain of the rearward cylinder 22 are rotated in opposite directions, it is required that the tensioners 44, 45 and the cam chain guides 38, 39, 41, 42 be placed differently, but the cylinders 21, 22 are designed to have almost the same structure. Specifically, the first cam chain tunnel 201 of the forward cylinder 21 and the second cam chain tunnel 202 of the rearward cylinder 22 are designed to have substantially the same structure regardless of difference of placement of the tensioners 44, 45, and the cam chain guides 38,39,41,42 between the cylinders 21,22. More specifically, as shown in FIG. 3, the inner wall face of the first cam chain tunnel 201 is formed such that an unused boss 204' is provided in a portion thereof, which is opposite to the lower side of the first cam chain 50 to enable attachment of the second cam chain tensioner 45 when the forward cylinder 21 is used as the rearward cylinder 22, and the portion thereof which is opposite to the upper side of the first cam chain 50 is shaped to enable engagement and abutment with the third cam chain guide 39 except the portion where the first cam tensioner 44 is attached when the forward cylinder 21 is used as the rearward cylinder 22. Reference numeral 210' denotes an engagement concave portion (first positioning portion)

engageable with the third cam chain guide 39. The inner wall face of the second cam chain tunnel 202 of the rearward cylinder 22 is formed such that an unused boss 203' is provided in a portion thereof, which is opposite to the upper side of the second cam chain 51 to enable attachment of the first cam chain tensioner 44 when the rearward cylinder 22 is used as the forward cylinder 21 and the portion which is opposite to the lower side of the second cam chain 51 is shaped to enable engagement and abutment with the first cam chain guide 38 except the portion where the second cam tensioner 45 is attached when the rearward cylinder 22 is used as the forward cylinder 21. Reference numeral 206' denotes an engagement concave portion (second positioning portion) engageable with the first cam chain guide 38. The unused bosses 203, 204 have hole portions respectively closed by bottom walls 203'a, 204a'. Thus, the forward and rearward cylinders 21, 22 have substantially the same structure regardless of different placement of the tensioners and the cam chain guides. Thereby, the raw members from which the cylinder blocks 21b, 22 of the cylinders 21, 22 are made are interchangeable between them and the raw members from which the cylinder heads 21a, 22a of the cylinders 21,22 are made are also interchangeable between them.

Although the junction of the cylinder head 21a and the cylinder block 21b, the junction of the cylinder head 22a and the cylinder block 22b, the junction of the cylinder block 21b and the crank case 23, and the junction of the cylinder block 22b and the crank case 23 are respectively drawn as being separated in FIGS. 1,3, for the sake of clarity, they are actually joined together.

A sprocket 77 for driving a pump drive shaft 47 and a generator 60 are provided on a portion 24a of the crank shaft 24 which is protruded leftward from the crank chamber 23c and externally of the first sprocket 31 and a recoil starter 61 is provided at a leftmost end portion of the crank shaft 24. A main shaft 80 of a belt converter is connected to a portion 24b of the crank shaft 24 which is protruded rightward from the crank chamber 23c and a drive pulley 59 is attached to the main shaft 80. Reference numeral 47 denotes a pump drive shaft and reference numerals 78, 76 respectively denote a chain and a sprocket for transmitting rotation of the crank shaft 24 to the pump drive shaft 47. Reference numeral 87 denotes an oil pump provided at a base portion of the pump drive shaft 47 and reference numeral 86 denotes a water pump provided at a tip end portion of the pump drive shaft 47.

Subsequently, operation of the V-twin engine having the above-described cam shaft driving structure will be described. When the crank shaft 24 is rotated, the intermediate shaft 28 is thereby rotated so that the forward cylinder cam shaft 29 and the rearward cylinder cam shaft 30 is rotated at a speed half as high as a speed of the crank shaft 24. Then, an intake valve and an exhaust valve of the forward cylinder 21 and an intake valve and an exhaust valve of the rearward cylinder 22 are opened/closed at given timings. At this time, run out of the intermediate shaft chain 49, run out of the first cam chain 50, and run out of the second cam chain 51 are suppressed by the chain guides 37–42. If the intermediate shaft chain 49, the first cam chain 50, and the second cam chain 51 are loosened, then the second intermediate shaft chain guide 40, the second cam chain guide 41, and the fourth cam chain guide 42 are respectively swung toward the corresponding chains by pressing forces exerted by the intermediate shaft chain tensioner 43, the first cam chain tensioner 44, and the second cam chain tensioner 45, thereby allowing tension of the intermediate shaft chain 49, tension of the first cam chain 50, and tension of the second cam chain 51 to be kept at predetermined levels.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A cam shaft driving structure of an Single Overhead Cam V-type engine comprising:

a crank shaft provided in a crank case;

a first cam shaft and a second cam shaft respectively provided in a cylinder head of a first cylinder and a cylinder head of a second cylinder, the first and second cylinders being arranged in an upper portion of the crank case such that the first and second cylinders are widened in V-shape in a forward and rearward direction with the crank shaft as a center;

an intermediate shaft rotatably provided in a portion of the crank case that is situated above the crank shaft and in parallel with the crank shaft;

a first cam chain and a second cam chain for respectively transmitting rotation of the intermediate shaft to the first and second cam shafts;

an intermediate shaft chain for transmitting rotation of the crank shaft to the intermediate shaft;

a first cam chain guide and a second cam chain guide for respectively guiding a tense side of the first cam chain and a loose side of the first cam chain; and a third cam chain guide and a fourth cam chain guide for respectively guiding a tense side of the second cam chain and a loose side of the second cam chain, wherein a fulcrum of the second cam chain guide and a fulcrum of the fourth cam chain guide are provided in the vicinity of the intermediate shaft, a first tensioner for the cam chain guide associated with one of the first and second cam chains in which its loose side corresponds to its upper side is provided in one of the cylinder heads, and a second tensioner for the cam chain guide associated with one of the first and second cam chains in which its loose side corresponds to its lower side is provided in a cylinder block of the cylinder.

2. The cam shaft driving structure of the Single Overhead Cam V-type engine of claim 1, wherein each of the second cam chain guide and the fourth cam chain guide is provided with two portions which respectively abut with the tensioners.

3. The cam shaft driving structure of the Single Overhead Cam V-type engine of claim 1, further comprising a means for positioning the first cam chain guide in a direction toward a base end thereof and a means for positioning the third cam chain guide in a direction toward a base end thereof in the crank case, wherein each of the first cam chain guide and the third cam chain guide is positioned in a direction toward a tip end thereof by a lower face of the corresponding cylinder head and is provided with two protrusions that abut with a corresponding cylinder block.

4. The cam shaft driving structure of the Single Overhead Cam V-type engine of claim 1, wherein the first and second cylinders are arranged such that one of the cylinders substantially overlaps with the other cylinder except the first to fourth cam chain guides and the first and second tensioners if the one cylinder is rotated 180 degrees about an imaginary axis orthogonal to a center axis of the crank shaft and a center axis of the intermediate shaft, each of the first and second cylinders is provided with a chain tunnel as a passage of the corresponding cam chain, the tunnel extending from a portion where a sprocket of the intermediate shaft is provided in the crank case to a portion where a sprocket of the cam shaft is provided in the corresponding cylinder head via the corresponding cylinder block, each of the cylinder head of the first cylinder and the cylinder head of the second cylinder is structured such that a boss to which the first tensioner is mounted when used in the cylinder associated with the cam chain in which its upper side corresponds to its loose side is provided in a wall portion of the chain tunnel that is situated in the corresponding cylinder head, a first positioning portion is provided in an inner wall face of the chain tunnel that is situated on the same side of the wall portion where the boss is provided, for positioning one of the second and fourth cam chain guides associated with the cam chain in which its tense side corresponds to its upper side, in a direction toward the cam shaft in a longitudinal direction thereof, and a second positioning portion is provided in an inner wall face of the chain tunnel that is situated on an opposite side of the wall portion where the boss is provided, for positioning one of the second and fourth cam chain guides associated with the cam chain in which its tense side corresponds to its lower side, in a direction toward the cam shaft in a longitudinal direction thereof, and each of the cylinder block of the first cylinder and the cylinder block of the second cylinder is structured such that a boss to which the second tensioner is mounted when used in the cylinder associated with the cam chain in which its lower side corresponds to its loose side is provided in a wall portion of the chain tunnel that is situated in a corresponding cylinder block, an inner wall face of the chain tunnel that is situated on the same side of the wall portion where the boss is provided is shaped to enable abutment with a back face of one of the second and fourth cam chain guides associated with the cam chain in which its tense side corresponds to its lower side, and an inner wall face of the cam chain tunnel that is situated on an opposite side of the wall portion where the boss is provided is shaped to enable abutment with a back face of one of the second and fourth cam chain guides associated with the cam chain in which its tense side corresponds to its upper side.

5. The cam shaft driving structure of the Single Overhead Cam V-type engine of claim 1, further comprising: an intermediate shaft chain guide that swings about the fulcrum of one of the second and fourth cam chain guides associated with the cam chain in which its loose side corresponds to its lower side, thereby making contact with the loose side of the intermediate shaft chain.

6. The cam shaft driving structure of the Single Overhead Cam V-type engine of claim 1, wherein a transmission ratio between rotation of the crank shaft and rotation of the intermediate shaft is substantially 1 to 1 and sprockets of the intermediate shaft on which the first and second cam chains are installed have diameters substantially equal to or smaller than a diameter of a sprocket of the intermediate shaft on which the intermediate shaft chain is installed.

* * * * *